(12) United States Patent
Acharya et al.

(10) Patent No.: US 12,429,105 B2
(45) Date of Patent: Sep. 30, 2025

(54) ADDITIVELY MANUFACTURED ENERGY ABSORBING STRUT DEVICE

(71) Applicant: B/E Aerospace, Inc., Winston-Salem, NC (US)

(72) Inventors: Pradeep Acharya, Bangalore (IN); Sreekanth Rao, Bangalore (IN); Maxime Dempah, Atlanta, GA (US); Mahesh Hosmani, Bangalore (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 166 days.

(21) Appl. No.: 18/199,096

(22) Filed: May 18, 2023

(65) Prior Publication Data
US 2024/0044389 A1    Feb. 8, 2024

(30) Foreign Application Priority Data
Aug. 4, 2022  (IN) ............................. 202241044596

(51) Int. Cl.
*F16F 7/12* (2006.01)
*B33Y 80/00* (2015.01)
*B64D 11/06* (2006.01)

(52) U.S. Cl.
CPC .............. *F16F 7/128* (2013.01); *B33Y 80/00* (2014.12); *B64D 11/0619* (2014.12);
(Continued)

(58) Field of Classification Search
CPC . B60N 2/42745; B60N 2/433; F16F 2236/06; B64D 11/0619
(Continued)

(56) References Cited

U.S. PATENT DOCUMENTS 3,314,720 A    4/1967  Ralph et al.
3,847,252 A *  11/1974 Casciola ................. B63B 21/20
                                                     293/133
(Continued)

FOREIGN PATENT DOCUMENTS

EP    2095847 A1    9/2009
EP    3987196 A1    4/2022
(Continued)

OTHER PUBLICATIONS

Extended European Search Report dated Jan. 22, 2024; European Application No. 23189182.1.
(Continued)

*Primary Examiner* — Jose V Chen
(74) *Attorney, Agent, or Firm* — Suiter Swantz IP (57) ABSTRACT

An additively manufactured strut device including a cylinder body forming a chamber and a piston having a first part disposed in the internal chamber and a second part disposed outside of the chamber. A first deformable element formed as a lattice structure breaks to permit initial withdrawal of the piston when a tensive threshold is met and a second deformable crushes during continued withdrawal of the piston. In further embodiments, a third deformable element formed as a lattice structure may be collocated with the second deformable element. The strut may be manufactured by an additive manufacturing process. Applications for the energy absorbing strut include aircraft seat frames among other applications.

15 Claims, 7 Drawing Sheets

(52) U.S. Cl.
CPC ....... *F16F 2232/08* (2013.01); *F16F 2236/04* (2013.01); *F16F 2236/06* (2013.01)

(58) Field of Classification Search
USPC .......................................... 297/216.1, 216.13
See application file for complete search history.

(56) References Cited

U.S. PATENT DOCUMENTS

| | | | |
|---|---|---|---|
| 8,118,286 | B2 | 2/2012 | Chong |
| 9,016,448 | B2 | 4/2015 | Ludin et al. |
| 9,731,828 | B2 | 8/2017 | Lichota |
| 11,186,371 | B2 | 11/2021 | Lasell |
| 12,055,246 | B2 * | 8/2024 | Richter ................... F16L 57/02 |
| 2002/0033622 | A1 | 3/2002 | Jarnail et al. |
| 2005/0236241 | A1 | 10/2005 | Dusserre-Telmon et al. |
| 2010/0052378 | A1 * | 3/2010 | Marriott ............... B60N 2/4263 297/452.18 |
| 2010/0102170 | A1 | 4/2010 | LaConte |
| 2013/0049416 | A1 * | 2/2013 | Funke ..................... B60N 2/23 297/216.13 |
| 2015/0035340 | A1 * | 2/2015 | Lussan ............... B64D 11/0619 297/463.1 |
| 2016/0023769 | A1 * | 1/2016 | Zheng ................ B64D 11/0619 248/188.91 |
| 2017/0152048 | A1 * | 6/2017 | Schmeer ............ B64D 11/0619 |
| 2017/0274999 | A1 * | 9/2017 | Alamgir ................. B64D 25/04 |
| 2020/0096072 | A1 * | 3/2020 | Kawecki ................. F16F 7/112 |
| 2020/0340243 | A1 * | 10/2020 | Park ......................... E04B 1/98 |
| 2021/0207678 | A1 * | 7/2021 | Bielak, II ................. F16F 9/34 |
| 2021/0261259 | A1 * | 8/2021 | D'Alessio .......... B60N 2/42709 |
| 2021/0316865 | A1 * | 10/2021 | Lasell .................. B64D 11/064 |
| 2022/0128175 | A1 | 4/2022 | Richter et al. |
| 2022/0267009 | A1 * | 8/2022 | Madrigal ............. B60N 2/4221 |

FOREIGN PATENT DOCUMENTS

| | | | |
|---|---|---|---|
| FR | 2931910 A1 * | 12/2009 | ............. F15B 15/19 |
| WO | 1992005072 A1 | 4/1992 | |
| WO | 2020247105 A2 | 12/2020 | |

OTHER PUBLICATIONS

Design of thin wall structures for energy absorption applications: Enhancement of crashworthiness due to axial and oblique impact forces, Elsevier; https://www.sciencedirect.com/science/article/abs/pii/S0263823113000815.

Energy absorption, deformation and crushing behavior of bimetallic tubes with different crosssectional shapes under axial loading, extension://efaidnbmnnnibpcajpcglclefindmkaj/https://iopscience.iop.org/article/10.1088/1757-899X/404/1/012043/pdf.

Simulation and Experiment of a Kind of Thin-Walled Type Crushing Member Used for Anti-impact Column, https://www.researchgate.net/publication/351653688_Simulation_and_Experiment_of_a_Kind_of_Thin-Walled_Tube_Crushing_Member_Used_for_Antiimpact_Column/download.

* cited by examiner

ADDITIVELY MANUFACTURED ENERGY ABSORBING STRUT DEVICE

CROSS-REFERENCE TO RELATED APPLICATION

This nonprovisional application claims the benefit of priority of Indian Patent Application Number 202241044596 filed Aug. 4, 2022 for "ADDITIVELY MANUFACTURED ENERGY ABSORBING STRUT DEVICE," which is hereby incorporated by reference in its entirety.

TECHNICAL FIELD AND BACKGROUND

The present disclosure relates generally to energy absorbing and load limiting devices, and more particularly to an additively manufactured connecting strut device including both a breakable lattice feature and a crushable cylinder feature.

Additive manufacturing, also known as 3D printing, is the process whereby physical objects are built layer-by-layer from computer aided designs (CAD). Each layer is built from material deposited on a support and solidified using electromagnetic radiation, such as from a laser or electron beam. The layering process continues until the building process is complete. Advantages of additive manufacturing over conventional building processes include, but are not limited to, lighter weight, strength, durability, faster build times, decreased costs, and the ability to produce precise features and complex geometries.

Struts are devices commonly used in engineering, aeronautics, and automotive applications, among others. In use, a strut links two components and operates in at least one of compression and tension to absorb energy in the case of impact on at least one of the two components. A strut generally includes a cylinder body forming an internal chamber. One end of the cylinder body is attached to one of the components. A piston, disposed in the internal chamber, is connected at one end to the other component. In operation, force on one of the components greater than a threshold amount causes an action in the strut, typically manifested as a controlled relative movement between the piston and the cylinder body.

Aircraft passenger seat constructions are one application particularly suited to benefit from the use of struts. Currently in passenger seating, seat components are not provided with any energy absorbing or load limiting features. During crash scenarios, seat components undergo plastic deformations and fail in an unpredictable manner resulting in occupant injury, seat deformation, and structural failures in the seat.

Therefore, what is needed is an energy absorbing solution which can limit loads on seat components by absorbing impact energy by undergoing plastic deformation via a predictable failure mechanism, and which benefits from the advantages of being additively manufactured.

BRIEF SUMMARY

Broadly speaking, the present disclosure is directed to additively manufactured energy absorbing and load limiting strut devices for aeronautics applications, among other applications benefitting from such a strut device.

To achieve the foregoing and other advantages, the inventive aspects disclosed herein are directed to an energy absorbing strut device including a cylinder body having an internal chamber and a first axial end attachable to a first component, and a piston having a first part disposed inside the internal chamber and a second part disposed outside of the internal chamber, wherein a piston head is formed at an axial end of the first part, and wherein an axial end of the second part is attachable to a second component. A first deformable element, positioned outside of the cylinder body and connected to the cylinder body and to the first part of the piston, is configured to break to permit initial withdrawal of the piston relative to the cylinder body when a tensive threshold is met. A second deformable element, positioned inside the internal chamber of the cylinder body, is configured to be deformed by the piston head during continued withdrawal of the piston relative to the cylinder body.

In some embodiments, the first deformable element is an annular lattice structure having a first axial end connected to the second part of the piston and a second axial end connected to a second axial end of the cylinder body, and the annular lattice structure is configured to break into at least two separate parts when the tensive threshold is met.

In some embodiments, the strut device further comprises a third deformable element positioned inside the cylinder body configured to be crushed by the piston head during the continued withdrawal of the piston relative to the cylinder body.

In some embodiments, the first deformable element and the third deformable element are annular variable density lattice structures.

In some embodiments, the second deformable element is a deformable tube, the third deformable element is an annular lattice structure positioned between the second deformable element and the first part of the piston and circumferentially surrounding the first part of the piston, and the piston head is configured to engage an axial end of the crushable tube and an axial end of the third deformable element to cause the crushable tube and the third deformable element to deform during the continued withdrawal of the piston from the cylinder body.

In some embodiments, the second deformable element is a single-walled tube or a double-walled tube.

In some embodiments, the first deformable element is an annular variable density lattice structure.

In some embodiments, the energy absorbing strut device is manufactured by an additive manufacturing process.

The inventive aspects of the present disclosure are further directed to an aircraft seat frame including a first frame component, a second frame component, and an energy absorbing strut device forming a connecting link between the first frame component and the second frame component. The energy absorbing struct device includes a cylinder body having an internal chamber and a first axial end attached to the first component and a piston having a first part disposed inside the internal chamber and a second part disposed outside of the internal chamber, wherein a piston head is formed at an axial end of the first part, and wherein an axial end of the second part is attached to the second frame component. A first deformable element is positioned outside of the cylinder body and is connected to the cylinder body and to the first part of the piston, the first deformable element configured to break to permit initial withdrawal of the piston relative to the cylinder body when a tensive threshold is met. A second deformable element is positioned inside the internal chamber and is configured to be deformed by the piston head during continued withdrawal of the piston relative to the cylinder body.

In some embodiments, the first deformable element is an annular lattice structure having a first axial end connected to the second part of the piston and a second axial end connected to a second axial end of the cylinder body, and the annular lattice structure is configured to break into at least separate parts when the tensive threshold is met.

In some embodiments, the strut device further includes a third deformable element positioned inside the cylinder body configured to be crushed by the piston head during the continued withdrawal of the piston relative to the cylinder body.

In some embodiments, the second deformable element is a deformable tube, the third deformable element is an annular lattice structure positioned between the second deformable element and the first part of the piston and circumferentially surrounding the first part of the piston, and the piston head is configured to engage an axial end of the crushable tube and an axial end of the third deformable element to cause the crushable tube and the third deformable element to crush during the continued withdrawal of the piston from the cylinder body.

In some embodiments, the energy absorbing strut device is manufactured by an additive manufacturing process, the first frame component is a track fastener, and the second frame component is a leg or is attached to a leg.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Broadly speaking, the present disclosure provides embodiments of energy absorbing strut devices including first and second separate deformable elements, wherein the first deformable element responds when a predetermined threshold is met to activate the strut and the second deformable element responds to continued movement. In embodiments, the first deformable element is implemented as a lattice structure and the second deformable is implemented as a crushable tube. In use, the first and second deformable elements may operate in conjunction or sequentially. In some embodiments, the threshold is a tensive threshold and the lattice structure is configured to break into separate parts. In other embodiments, the threshold is a compressive threshold and the lattice structure is configured to compress. Applications for the energy absorbing strut device according to the present disclosure include, but are not limited to, aeronautic applications such as impact energy absorption in aircraft seat frames.

The energy absorbing strut device according to the present disclosure operates to link two components, for instance two aircraft seat frame components, and further operates to absorb impact energy by undergoing plastic deformation via a predictable failure mechanism. In a particular application, the linked components are associated with a seat frame.

Figure 1A:
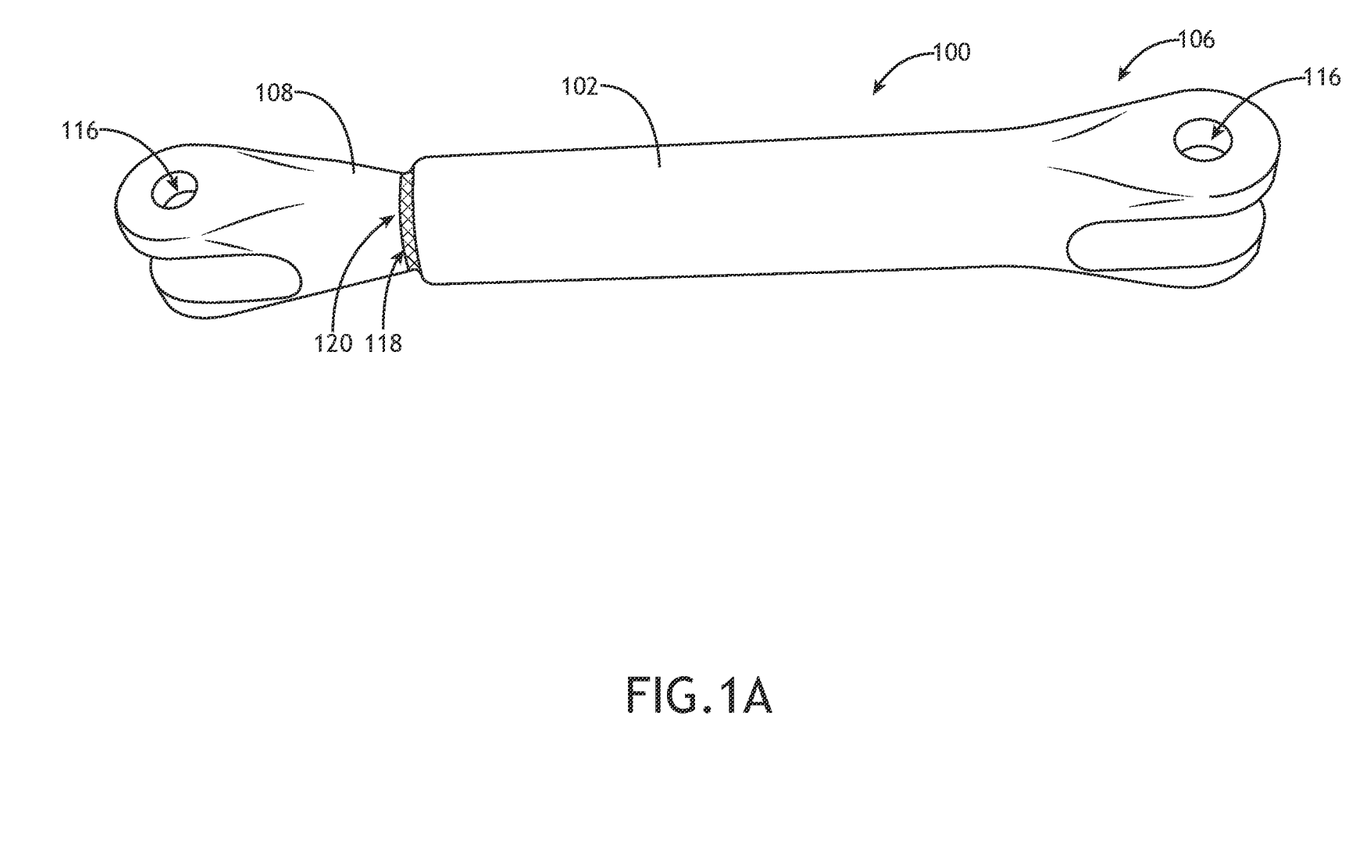
FIG. 1A is an isometric view of an energy absorbing strut device according to the present disclosure.
Figure 1B:
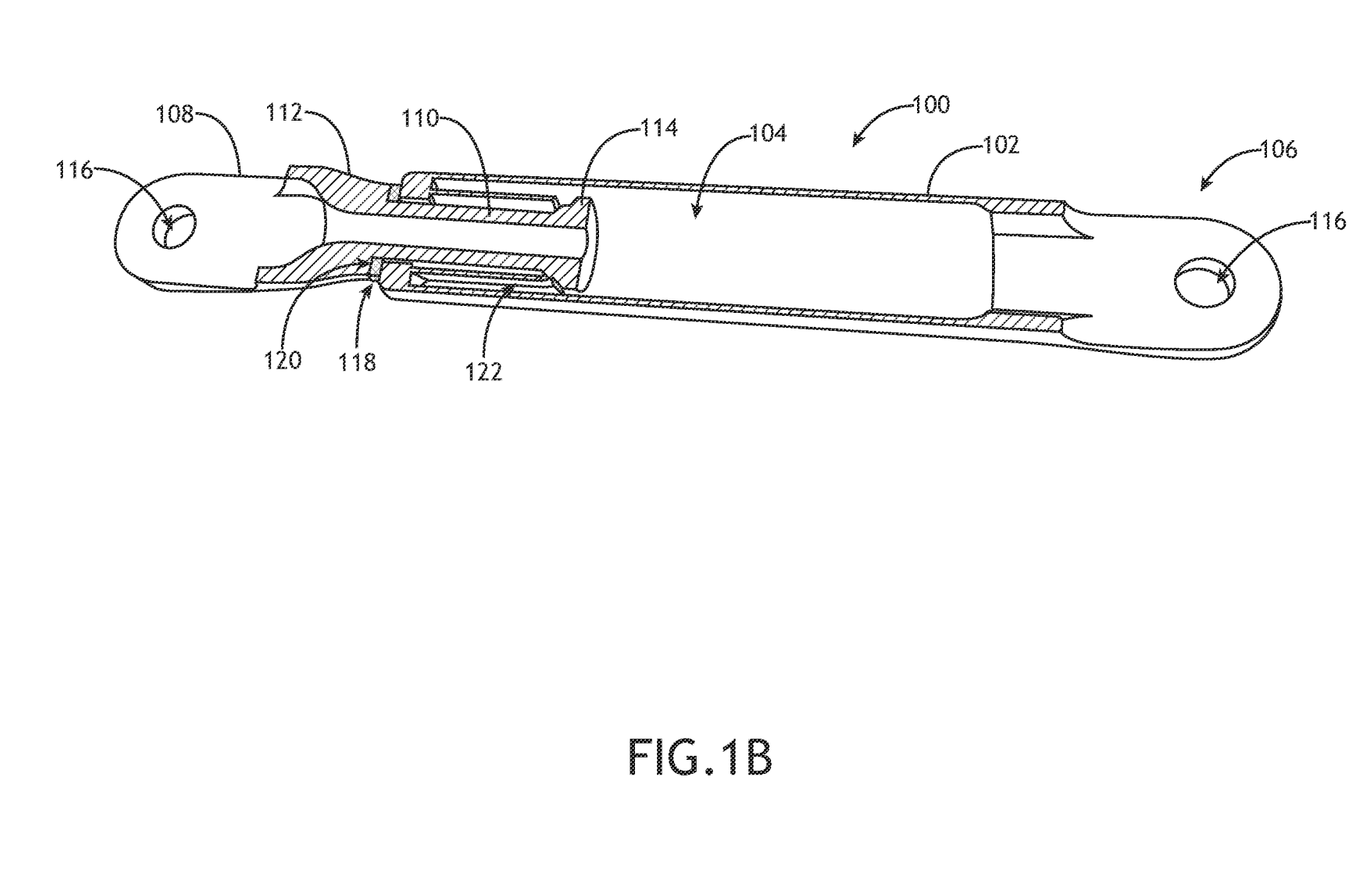
FIG. 1B is a longitudinal sectional view of the strut device of FIG. 1A.

FIGS. 1A and 1B illustrate a first embodiment of an energy absorbing strut device 100. The strut device 100 generally includes an elongated cylinder body 102 forming an internal chamber 104. A first axial end 106 of the cylinder body 102 is attachable to a first component. A piston 108 movably disposed in the cylinder body 102 includes a first part 110 disposed in the internal chamber 104 and a second part 112 disposed outside of the internal chamber, wherein the first and second parts are integrally formed. The cylinder body 102 and the piston 108 are axially aligned such that, in use, the piston 108 withdraws from the cylinder body 102 responsive to tension and may advance further into the cylinder body responsive to compression. It should be understood that, considering the configuration of the piston 108 and the cylinder body 102, the piston does not fully withdraw nor fully enter the cylinder body.

A piston head 114 is formed an axial end of the first part 110 configured to interact with the second deformable element as discussed further below. An axial end of the second part 112 is attachable to a second component. As shown, each of the axial end of the second part 112 and the first axial end 106 of the cylinder body 102 is divided to receive its respective one of the first and second components therebetween, and defines through holes 116 for receiving a fastener, for instance a clevis pin for removably attaching the respective component to the strut device.

A first deformable element 118 is positioned at the second axial end 120 of the cylinder body. In preferred embodiments, the first deformable element 118 is formed as an annular lattice structure having a first axial end connected to the second axial end 118 of the cylinder body 102 and a second axial end connected to the second part 112 of the piston 108, for example, to an annular flange. As such, the first deformable element 118 is positioned outside of the cylinder body 102.

In some embodiments, the lattice structure is a variable density lattice structure customizable to absorb impact energy according to, for example, the weight of the supported component such as the weight of an aircraft passenger seat. For example, a less porous (i.e., denser) lattice structure may be used to support a heavier seat, whereas a more porous (i.e., less dense) lattice structure may be used to support a lighter seat. In use, the lattice structure undergoes a structural change when the predetermined threshold is met. For example, when the threshold is a tensive threshold, the structural change may be breakage and separation of the lattice structure into at least two parts, and when the threshold is a compressive threshold the structural change may be a compression of the lattice structure with or without breakage.

A second deformable element 122 is positioned within the internal chamber 104. In preferred embodiments, the second deformable element 122 is formed as a crushable tube connected at one axial end to the inside face of the second axial end 118 of the cylinder body 102. The opposing terminal end of the tube is preferably detached from the cylinder body 102 and the piston 108. The piston head 114 is positioned engaging or proximal to the detached terminal end of the crushable tube. In some embodiments, the detached terminal end of the crushable tube may be flared outward to guide initial engagement of the piston head 114 and collapse of the tube.

Figure 2:
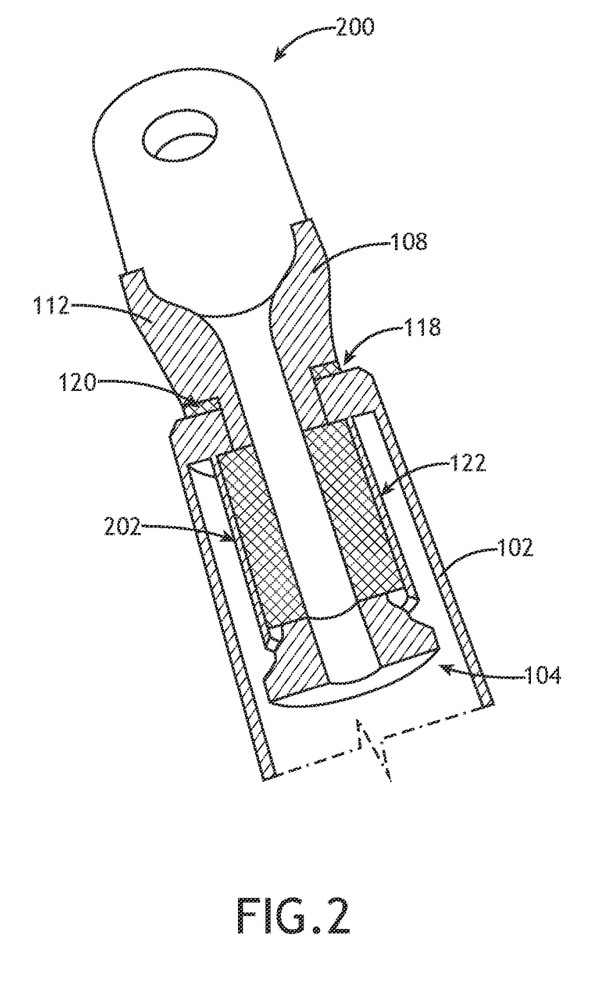
FIG. 2 is a detailed view of an alternative embodiment of the annular lattice structure.

FIG. 2 illustrates an alternative embodiment of a strut device 200 according to the present disclosure. Like the first embodiment, the second embodiment also includes the elongated cylinder body 102 forming the internal chamber 104 and the piston 108 having a portion of the piston disposed in the internal chamber. In addition, like the first embodiment, the first deformable element 118 is positioned at the second axial end 120 of the cylinder body and is formed as an annular lattice structure having the first axial end connected to the second axial end 118 of the cylinder body 102 and the second axial end connected to the second part 112 of the piston 108. In use, when a tensive threshold is met, the first deformable element 118 may break forming at least two separate parts.

Whereas the first embodiment includes a second crushable element 122 acting inside the cylinder body, the second embodiment includes both the second crushable element 122 and additionally a third crushable element 202 implemented as an annular lattice structure disposed within the interior chamber. As shown, the annular lattice structure is disposed within the interior of the crushable tube of the second crushable element 122 positioned between the tube and the first part of the piston. A first axial end of the third crushable element 202 is positioned proximal to the detached terminal end of the crushable tube, and a second axial end of the third crushable element is connected to or positioned proximal to the inner face of the second axial end of the cylinder body 104. In some embodiments, the annular lattice structure of the third element circumferentially surrounds the second part 112 of the piston 108.

In some embodiments, the lattice structure of the third element 202 is a variable density lattice structure tailored to absorb impact energy according to the weight of the supported component, for instance an aircraft passenger seat. For example, a less porous lattice structure may be used to support a heavier seat, whereas a more porous lattice structure may be used to support a lighter seat. In use, the lattice structure undergoes a structural change when the predetermined threshold is met. For example, when the threshold is a tensive threshold, the structural change may be compression of the lattice structure. In some embodiments, the second and third elements 122, 202 work in conjunction in an additive capacity during continued withdrawal of the piston 108 from the cylinder body 102.

Figure 3A:
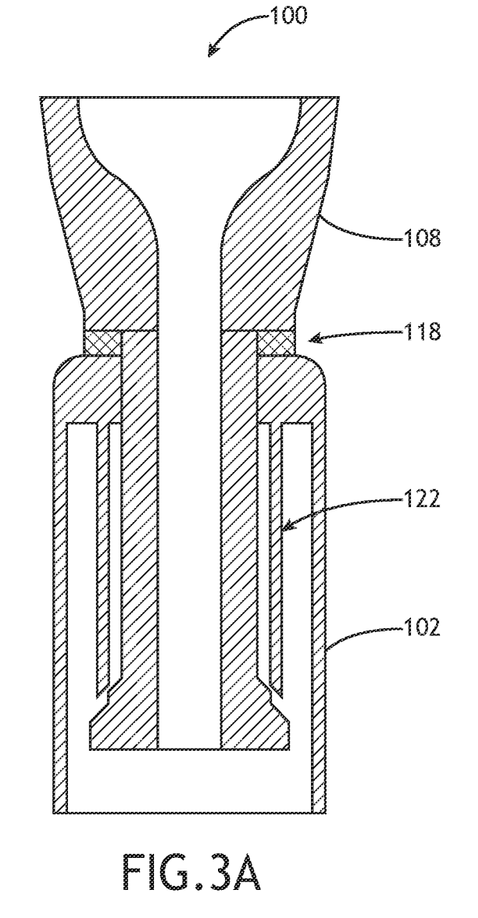
FIG. 3A shows a strut including an intact lattice structure and single-walled crushable element.
Figure 3B:
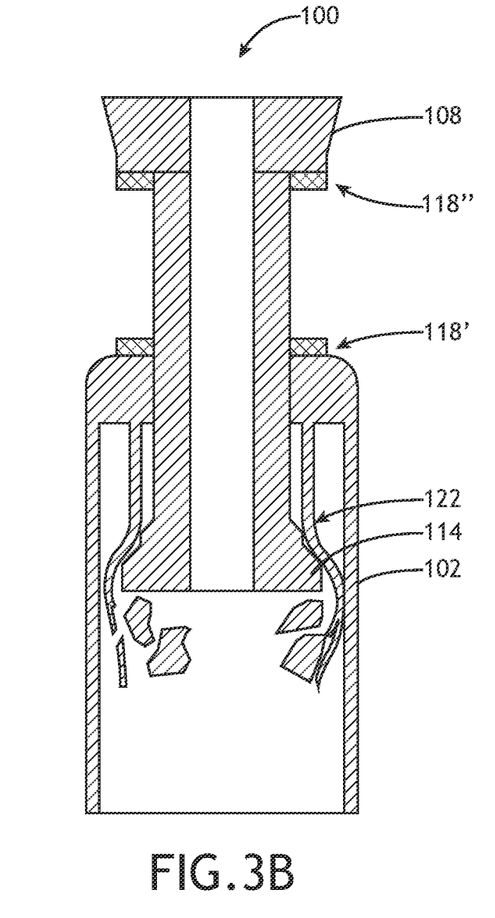
FIG. 3B shows the strut of FIG. 3A after being subjected to a threshold tensive load.

FIGS. 3A and 3B illustrate an exemplary strut device 100 according to the first embodiment before and after activation. FIG. 3A shows the initial position of the piston 108 relative to the cylinder body 102 wherein the first deformable element 118 is intact (i.e., unbroken) and the second deformable element 122 is intact (i.e., not deformed). In other words, FIG. 3A illustrates the condition of the strut device 100 in which the tensive threshold has not yet been met, and FIG. 3B shows the condition of the strut device after the tensive threshold has been met.

FIG. 3B illustrates an activated condition of the strut device 100. As shown, the first deformable element 118 implemented as a lattice structure has been broken leaving a first lattice part 118' attached to the second axial end of the cylinder body 102 and a second lattice part 118" attached the second part of the piston 108. In some embodiments, the lattice structure includes an engineered fault. For example, the lattice structure may be configured to stretch until an elastic limit is reached, and upon reaching the elastic limit, the lattice structure breaks to form two separate parts. As withdrawal of the piston 108 continues, subsequent to or concurrently with the first deformable element 118 breaking, the piston 108 advances into the formed single-wall tube of the second deformable element 122 thereby causing the tube to deform. As shown, the deformation includes at least expansion of the tubular walls laterally outward driven by the advancing force of the tapered piston head 114.

Figure 4A:
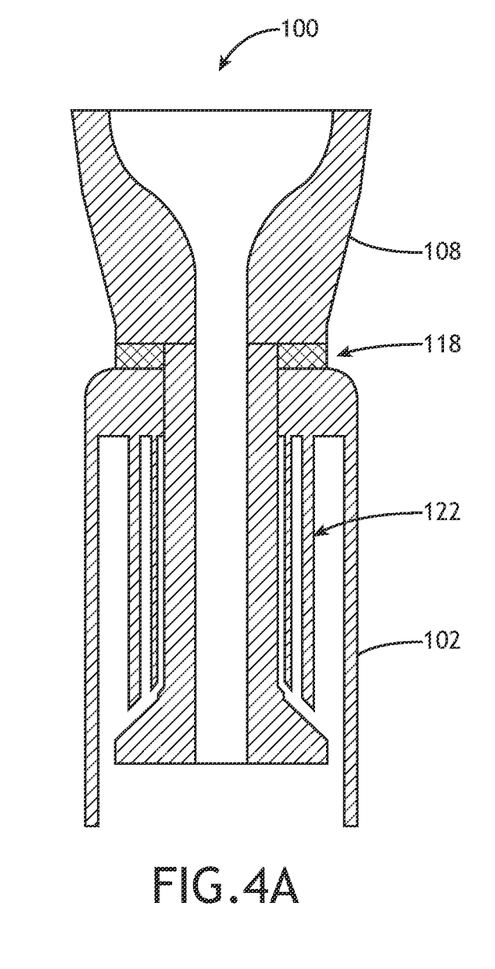
FIG. 4A shows a strut including an intact lattice structure and double-walled crushable element.
Figure 4B:
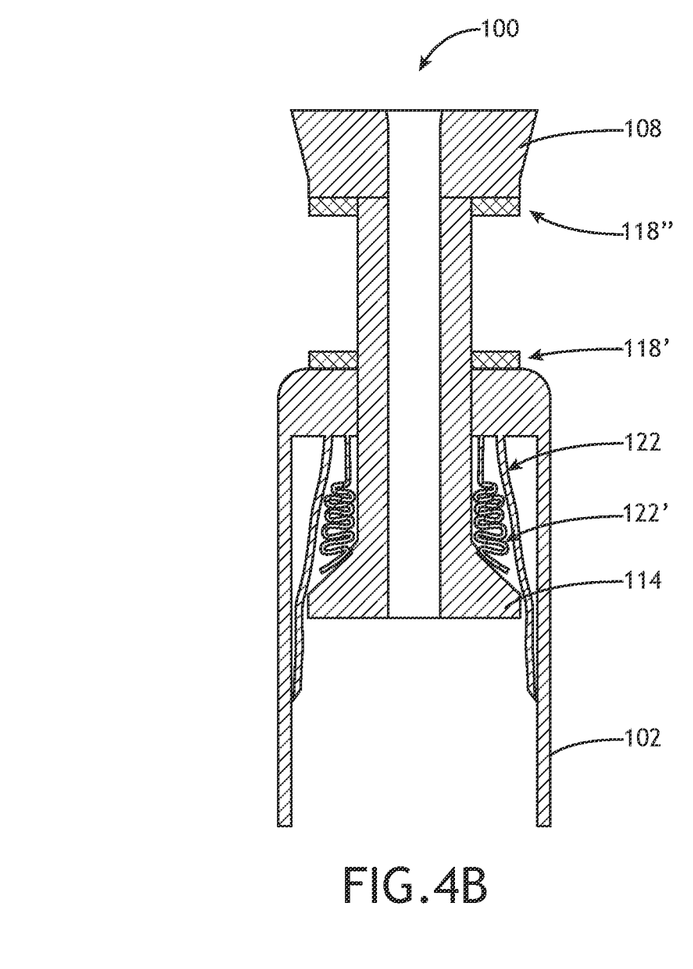
FIG. 4B shows the strut of FIG. 4A after being subjected to a threshold tensive load.

FIGS. 4A and 4B illustrate another version of the exemplary strut device 100 according to the first embodiment before and after activation. Whereas the embodiment shown in FIGS. 3A and 3B includes a single-walled tube, the embodiment shown in FIGS. 4A and 4B includes a double-walled tube. FIG. 4A shows the initial position of the piston 108 relative to the cylinder body 102 in which the first deformable element 118 (i.e., lattice structure) is intact (i.e., unbroken) and the second deformable element 122 (i.e., double-walled tube) is intact (i.e., not deformed). In other words, FIG. 4A shows the condition of the strut device 100 in which the tensive threshold has not yet been met, and FIG. 4B shows the condition of the strut device after the tensive threshold has been met.

FIG. 4B illustrates an activated condition of the strut device 100. As shown, the lattice structure has been broken and the advancing piston head 114 has caused the outer tube wall 122' to deform laterally outward and the inner tube wall 122" to crush (e.g., fold on itself) caused by the advancing force of the tapered piston head 114 into the double-walled tube.

Figure 5A:
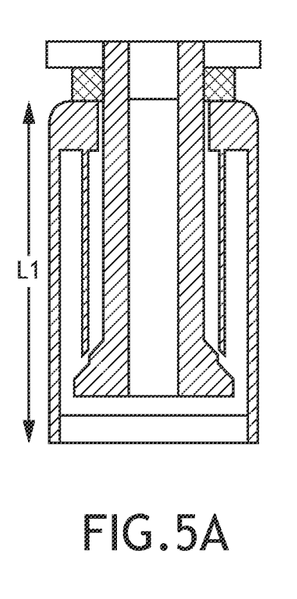
FIGS. 5A-E are sectional views showing sequential action of the strut device.
Figure 5B:
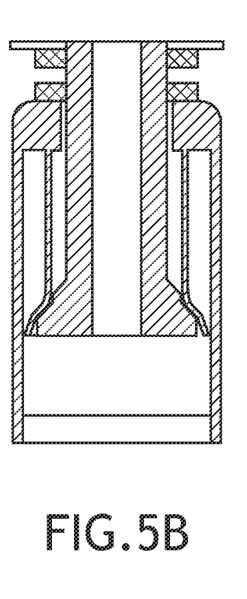
Figure 5C:
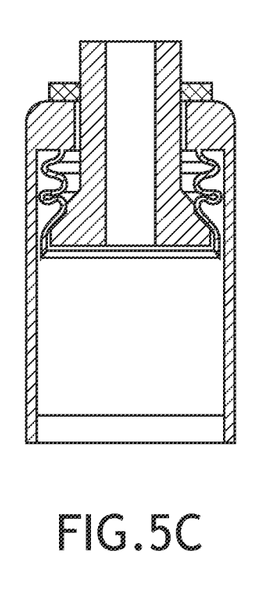
Figure 5D:
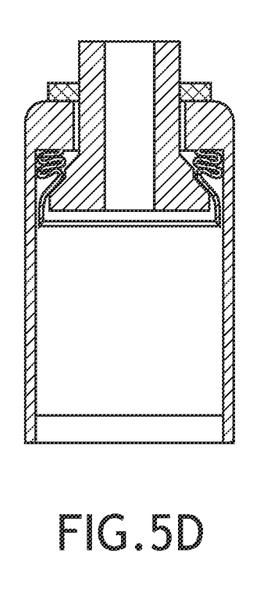
Figure 5E:
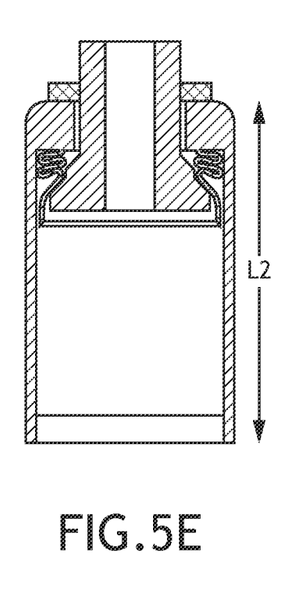

FIGS. 5A-5E illustrate the sequential action of the strut device according to the first embodiment 100. FIG. 5A illustrates the strut device 100 prior to the tensive threshold being met defining a first distance L1 extending from the second axial end of the tubular body to an arbitrary point along the length of the cylinder body. FIG. 5B illustrates the breakage or fracture of the lattice structure and simultaneous entry of the tapered piston head into the detached end of the tube of the second deformable element, thereby causing the terminal end of the tube to flare outward. FIG. 5C illustrates the continued withdrawal of the piston and advancement of the piston head thereby causing the tube to crush or fold on itself. FIG. 5D illustrates the maximum crushability of the tube caused by continued withdrawal of the piston. FIG. 5E illustrates completion of the action of the strut device whereby the withdrawing piston, having fully crushed or compressed the tube, continues its withdrawal thereby pulling the second axial end of the cylinder body causing the cylinder body to extend in the axial direction, as evidenced comparing L2 shown in FIG. 5E to L1 shown in FIG. 5A. In some embodiments, the cylinder body resists expansion in the axial direction and thus the struct action is complete as illustrated in FIG. 5D.

Figure 6A:
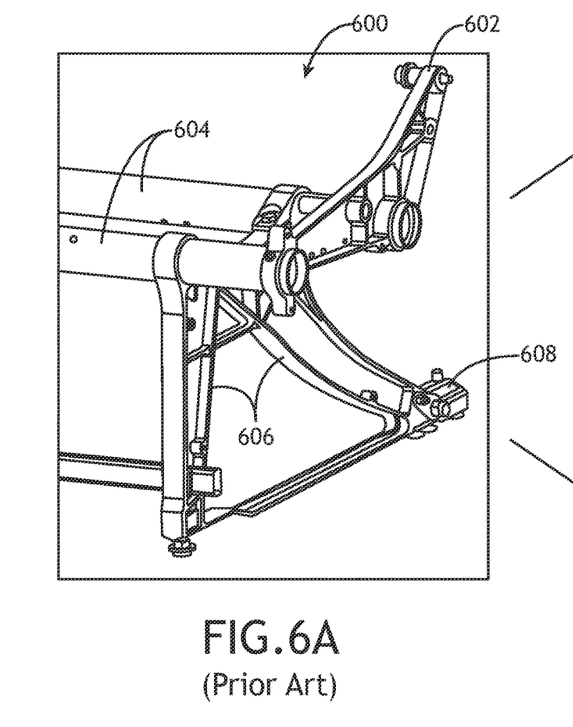
FIG. 6A shows a prior art aircraft seat frame.
Figure 6B:
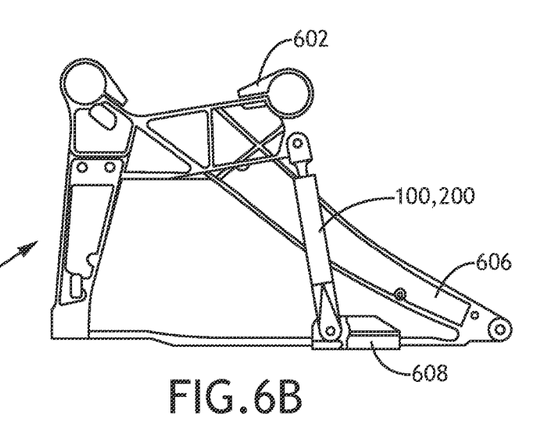
FIG. 6B shows a strut device according to the present disclosure incorporated into an aircraft seat frame.
Figure 6C:
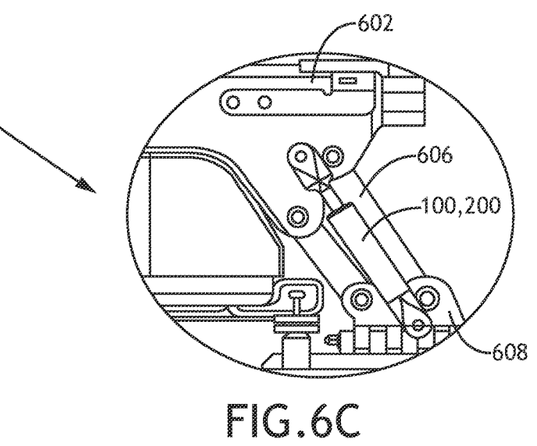
FIG. 6C shows a strut device according to the present disclosure incorporated into a further aircraft seat frame.

FIG. 6A illustrates a portion of a prior art seat frame 600 generally including a spreader 602, transverse beams 604, and legs 606. Track fasteners 608 attached to the ends of the legs function to secure the legs to the aircraft deck, for example, to a seat track embedded in the floor. FIG. 6B illustrates a first implementation of the struct devices of the present disclosure in an aircraft seat frame. As shown, the strut device 100, 200 extends from a track fastener 608 to a location on the spreader 602, thereby forming an energy absorbing connecting link between the two components. In use, the strut device 100, 200 relieves tensive loading on the seat legs 606 by limiting upward motion of the seat frame. FIG. 6C illustrates a second implementation of the struct devices of the present disclosure in an aircraft seat frame. As shown, the strut device 100, 200 extends from a track fastener 608 to another location on the spreader 602, thereby forming an energy absorbing connecting link between the two seat frame components. In use, the strut device 100, 200 relieves tensive loading on the seat legs 606 by limiting upward motion of the seat frame.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. An energy absorbing strut device, comprising:
a cylinder body having an internal chamber and a first axial end attachable to a first component;
a piston having a first part disposed inside the internal chamber and a second part disposed outside of the internal chamber, wherein a piston head is formed at an axial end of the first part, and wherein an axial end of the second part is attachable to a second component;
a first deformable element positioned outside of the cylinder body, the first deformable element connected to the cylinder body and to the first part of the piston, the first deformable element configured to break, responsive to tension, to permit initial withdrawal of the piston relative to the cylinder body; and
a second deformable element positioned inside the internal chamber and configured to be deformed by the piston head during continued withdrawal of the piston relative to the cylinder body.

2. The energy absorbing strut device according to claim 1, wherein:
the first deformable element is an annular lattice structure having a first axial end connected to the second part of the piston and a second axial end connected to a second axial end of the cylinder body; and
the annular lattice structure is configured to break into at least two separate parts.

3. The energy absorbing strut device according to claim 1, further comprising a third deformable element positioned inside the cylinder body and configured to be crushed by the piston head during the continued withdrawal of the piston relative to the cylinder body.

4. The energy absorbing strut device according to claim 3, wherein the first deformable element and the third deformable element are annular variable density lattice structures.

5. The energy absorbing strut device according to claim 3, wherein:
the second deformable element is a deformable tube;
the third deformable element is an annular lattice structure positioned between the second deformable element and the first part of the piston and circumferentially surrounding the first part of the piston; and
the piston head is configured to engage an axial end of the deformable tube and an axial end of the third deformable element to cause the deformable tube and the third deformable element to deform during the continued withdrawal of the piston from the cylinder body.

6. The energy absorbing strut device according to claim 1, wherein the second deformable element is a single-walled tube or a double-walled tube.

7. The energy absorbing strut device according to claim 1, wherein the first deformable element is an annular variable density lattice structure.

8. The energy absorbing strut device according to claim 1, manufactured by an additive manufacturing process.

9. An aircraft seat frame, comprising:
a first frame component;
a second frame component; and
an energy absorbing strut device forming a connecting link between the first frame component and the second frame component, the energy absorbing struct device comprising:
a cylinder body having an internal chamber and a first axial end attached to the first frame component;
a piston having a first part disposed inside the internal chamber and a second part disposed outside of the internal chamber, wherein a piston head is formed at an axial end of the first part, and wherein an axial end of the second part is attached to the second frame component;
a first deformable element positioned outside of the cylinder body, the first deformable element connected to the cylinder body and to the first part of the piston, the first deformable element configured to break, responsive to tension, to permit initial withdrawal of the piston relative to the cylinder body; and
a second deformable element positioned inside the internal chamber and configured to be deformed by the piston head during continued withdrawal of the piston relative to the cylinder body.

10. The aircraft seat frame according to claim 9, wherein:
the first deformable element is an annular lattice structure having a first axial end connected to the second part of the piston and a second axial end connected to a second axial end of the cylinder body; and
the annular lattice structure is configured to break into at least separate parts.

11. The aircraft seat frame according to claim 9, further comprising a third deformable element positioned inside the cylinder body and configured to be crushed by the piston head during the continued withdrawal of the piston relative to the cylinder body.

12. The aircraft seat frame according to claim 11, wherein the first deformable element and the third deformable element are annular variable density lattice structures.

13. The aircraft seat frame according to claim 11, wherein:
the second deformable element is a deformable tube;

the third deformable element is an annular lattice structure positioned between the second deformable element and the first part of the piston and circumferentially surrounding the first part of the piston; and the piston head is configured to engage an axial end of the crushable tube and an axial end of the third deformable element to cause the crushable tube and the third deformable element to deform during the continued withdrawal of the piston from the cylinder body.

14. The aircraft seat frame according to claim 9, wherein the second deformable element is a single-walled tube or a double-walled tube.

15. The aircraft seat frame according to claim 9, wherein:
the energy absorbing strut device is manufactured by an additive manufacturing process;
the first frame component is a track fastener; and
the second frame component is a leg or is attached to a leg.

\* \* \* \* \*